United States Patent [19]
Pepe

[11] Patent Number: 5,553,370
[45] Date of Patent: Sep. 10, 1996

[54] METHOD FOR REPAIR OF STEAM TURBINE BLADES

[76] Inventor: John Pepe, 11671 Rabaul Dr., Cypress, Calif. 90630

[21] Appl. No.: 385,964

[22] Filed: Feb. 9, 1995

[51] Int. Cl.[6] .................................................... B23P 15/00
[52] U.S. Cl. .......................... 29/889.1; 29/889.7; 228/119
[58] Field of Search ................................. 29/889, 889.1, 29/889.7, 428; 228/119

[56] References Cited

U.S. PATENT DOCUMENTS

| | | | |
|---|---|---|---|
| 4,028,788 | 6/1977 | DeMusis | 29/156.8 |
| 4,589,175 | 5/1986 | Arrigoni | 29/156.8 |
| 4,611,744 | 9/1986 | Fraser et al. | 228/119 |
| 4,657,171 | 4/1987 | Robins | 228/119 |
| 4,705,203 | 11/1987 | McComas et al. | 228/119 |
| 4,726,101 | 2/1988 | Draghi et al. | 29/156.8 |
| 4,726,104 | 2/1988 | Foster et al. | 29/156.8 |
| 4,873,751 | 10/1989 | Walker et al. | 29/156.8 |
| 4,896,408 | 1/1990 | Fraser | 29/156.8 |
| 4,951,390 | 8/1990 | Fraser et al. | 29/889.1 |
| 5,071,054 | 12/1991 | Dzugan et al. | 228/119 |
| 5,207,371 | 5/1993 | Prinz et al. | 228/125 |
| 5,238,368 | 8/1993 | Ortolano | 416/191 |
| 5,253,978 | 10/1993 | Fraser | 416/190 |
| 5,261,480 | 11/1993 | Wortmann et al. | 164/256 |
| 5,272,809 | 12/1993 | Robertson et al. | 29/889 |

*Primary Examiner*—Irene Cuda
*Attorney, Agent, or Firm*—Denton L. Anderson; Philip J. Anderson; Sheldon & Mak, Inc.

[57] ABSTRACT

A method for repairing the ends of turbine blades is set forth which includes positioning the blade end at a backing plate, depositing layered weldment on the plate and thereafter machining the deposited weldment to fashion the repaired blade end. A blade having its end fashioned according to the method is also set forth.

8 Claims, 3 Drawing Sheets

METHOD FOR REPAIR OF STEAM TURBINE BLADES

FIELD OF THE INVENTION

The present invention relates to the repair or reconstruction of turbine blades by weldment deposit.

BACKGROUND OF THE INVENTION

When turbine blades become damaged, they are removed from the turbine rotor for repair or replacement. In some turbines the turbine blades of each circumferential course or row has its distal end secured to a circumferential shroud. The blade has one end, as is well known, attached to the rotor by suitable means such as being configured received in a cooperative opening fashioned on the rotor. To secure the other blade end, each turbine blade has a radially projecting tennon received in a cooperative opening in the shroud. The tennon is mechanically coupled to the shroud as by peening to secure each end of the turbine blade to the shroud.

To remove the damaged turbine blade or blades, the blade end is separated from the shroud as by cutting or other technique which necessarily destroys or damages the tennon. At the rotor, the blade is separated in a fashion commensurate with the manner in which it is attached. Heretofore, depending upon the extent of the repairs necessary, total replacement of the blade may be indicated. The new blade has on one end a tennon thereon to facilitate reconnection to the shroud and the other end fashioned for reconnection to the rotor. New blades are expensive and may be subject to delays in manufacture and shipment. Alternatively, it may be decided to instead repair the blade. During repair it is necessary to reconstruct a suitable tennon on the blade for reconnection to the shroud. One technique, as described in Frasier U.S. Pat. No. 4,896,408 is to provide a new tennon component which is weldably attached to a prepared turbine blade to define the new tennon for reconnection of the blade to the shroud. This technique necessarily requires the construction of a new tennon component, preparation of the end of the turbine blade to cooperatively receive the new tennon component, precisely locating the new tennon component and thereafter securing the new tennon part to the blade end as by brazing or welding. It is submitted that this technique suffers from the deficiencies of being complex and time consuming and subject to problems in regards to locating and maintaining the location during the welding to attach the tennon component to the blade. The new tennon component must be crafted to match a specific blade profile, positioned and secured to define the proper length of the blade for return of the blade to service. Accordingly, a better method and technique are required to reconstruct a turbine blade distal end without suffering from the deficiencies noted above.

It is also known to have the distal ends of the turbine blades of any course fashioned to have an integral shroud. In an integral shroud the distal ends of the turbine blades are cooperatively configured into a shroud component to mate with adjacent blade ends to define a shroud to restrain the movement of the distal blade ends during operation of the turbine. Should the blade become damaged at the distal end, the blade must be removed to be repaired including repairing the configuration of the integral shroud component at the blade distal end. It may also be necessary to completely reconstruct the shroud component at the blade distal end or to fashion one on either a new blade or a blade which heretofore did not have a integral shroud component thereon.

As with shrouded turbine blades, there has been no satisfactory technique to repair and recondition the distal end of integral shroud turbine blades.

SUMMARY OF THE INVENTION

Toward this end, a method is set forth according to the present invention which provides a satisfactory method for the repair, reconstruction and reconfiguration of turbine blade ends.

After removal of the turbine blade from the rotor and shroud, which has destroyed or damaged the tennon on the turbine blade shroud end, the method according to the present invention includes securing one or more blades to a backing plate to present the blade shroud end through and at one side of the plate. The backing plate is appropriate configured as by having cooperatively openings to closely pass the blade end. The backing strip and turbine blades are thereafter positioned in a holding fixture which includes at least one retaining strip located proximate the side of the plate at which the turbine blade shroud ends are presented to define, in cooperation with the plate, a space adjoining the presented turbine blade shroud end. Thereafter a plurality of layered weldments are deposited in the space, on the backing plate and thereby building weldment on the blade shroud end. The depositing of the weldment may be by gas tungsten arc welding processes, plasma-arc welding, electron beam welding, laser-beam welding, submerged arc welding or gas metal arc welding. The deposit may be automated as by an automated welding device. Subsequent to the depositing of a sufficient buildup of layered weldments, the backing plate, blade and deposited weldment are removed from the fixture, the blades are separated and the backing plate and weldment is machined to fashion the desired turbine shroud end. According to the method of the present invention, the turbine blade end after receiving the weldment buildup may be machined to define a tennon adapted to couple the turbine blade distal end of the shroud or may be fashioned into an integral shroud component as desired.

One or more substantially parallel retaining strips may be located proximate the plate to define a channel space to receive the layered weldment and confine the same to the channel. These strips may be constructed from copper or a copper alloy to prevent adherence of the weldment thereto. Further, the retaining strips may be cooled as by circulating a cooling fluid therethrough to reduce the time for the cooling of the weldment.

The method, according to the present invention, can also be used to repair the rotor end of blade if necessary.

The method according to the present invention provides for the repair of turbine blades obviating the necessity for expensive replacement with new blades.

The method according to the present invention provides for automated deposit of the layered weldment to yield economic benefits from a man hour standpoint in repairing the turbine blades.

The method according to the present invention, since the ends of the blades are machined, provides for the precise configuration of the turbine blade end so that it may easily be returned into service.

The method according to the present invention, which provides for the repair of turbine blades avoids turbine down time due to delays which may occasion the ordering, shipment and receipt or new, replacement turbine blades.

The method according to the present invention provides for conversion of one or more blades from a shroud-tennon arrangement to a turbine blade for an integral shroud application and vis-a-versa.

BRIEF DESCRIPTION OF THE DRAWINGS

These and other features and advantages will become apparent with reference to the specification claims and drawings wherein:

DESCRIPTION

Figure 2:
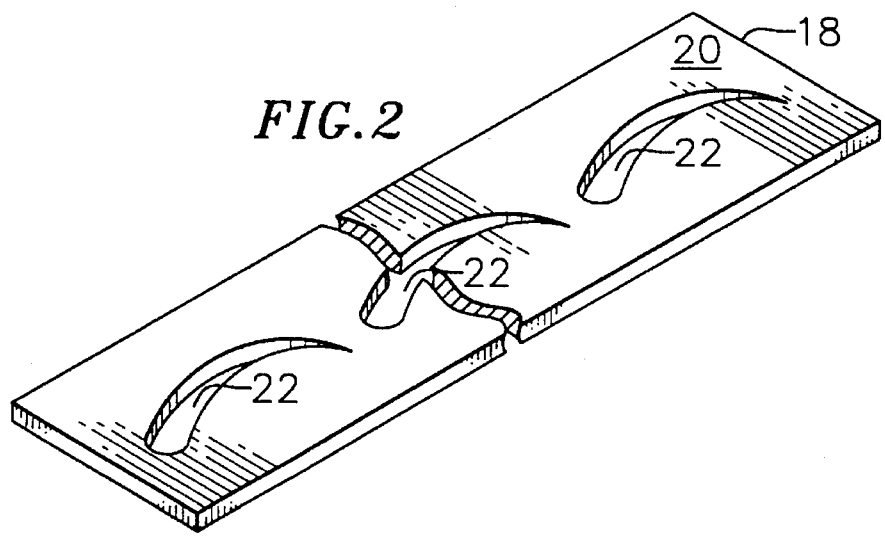
FIG. 2 is a broken perspective top view of a backing plate for use in a method according to the present invention.
Figure 3:
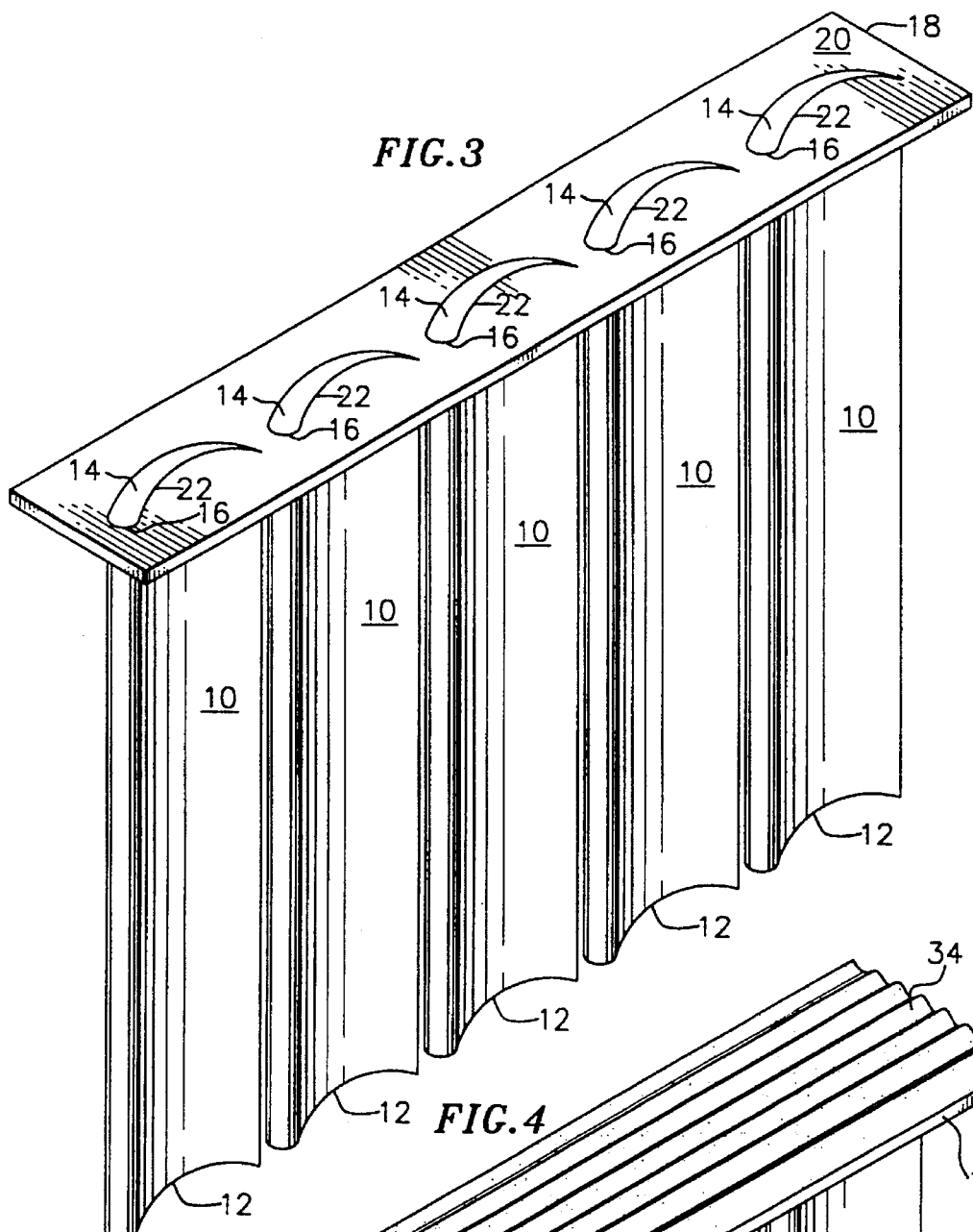
FIG. 3 is a perspective top-side view showing turbine blades positioned with the backing strip of FIG. 3.
Figure 4:
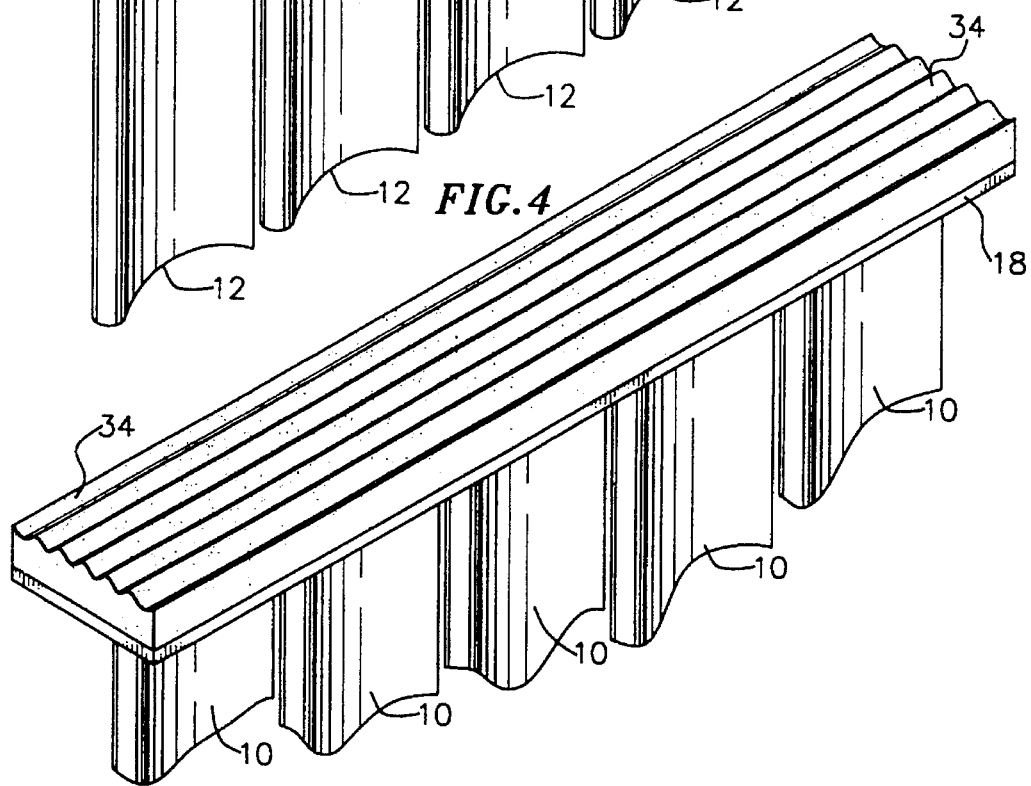
FIG. 4 is a top, side perspective view of the turbine blades positioned in the backing strip having layers of weldment deposited thereon.

The method according to the present invention is adapted to repair or refashion the ends of turbine blades. With reference to FIGS. 3 and 4, turbine blades 10 have been removed from the turbine rotor (not shown) for repair. Each of the turbine blades has a longitudinal dimension defining the length of the blade and a transverse, air foil-like shape defining the foil configuration for the blade 10. Each blade 10 has a first end 12 which is adapted, in a well-known fashion, to be secured to the turbine rotor. Opposite the first end, each blade 10 has a second end 14 which, according to FIGS. 2–6 has been fashioned as by cutting or grinding to present a substantially planer transverse surface 16 at the end of the blade 10.

To effectuate repair of the blade 10, one or more of the blades 10 are disposed to present an end 12, 14 through a planer backing plate 18. The backing plate 18 has an upper surface 20 and has been fashioned with openings 22 cooperatively configured to closely pass the blade ends 12, 14 as shown in FIGS. 2 and 3. Each of the blades 10 is positioned such that the end 12, 14 is arranged substantially co-planer with backing plate upper surface 20. In this position, each of the blades 10 is retained in the aforementioned position by any suitable technique such as by, for example, a tack weld or the like. While the backing plate 18 is shown in the drawings as retaining five blades 10, it is to be understood that the backing plate 18 could have a length sufficient to accommodate a larger or smaller number of blades 10.

Figure 1:
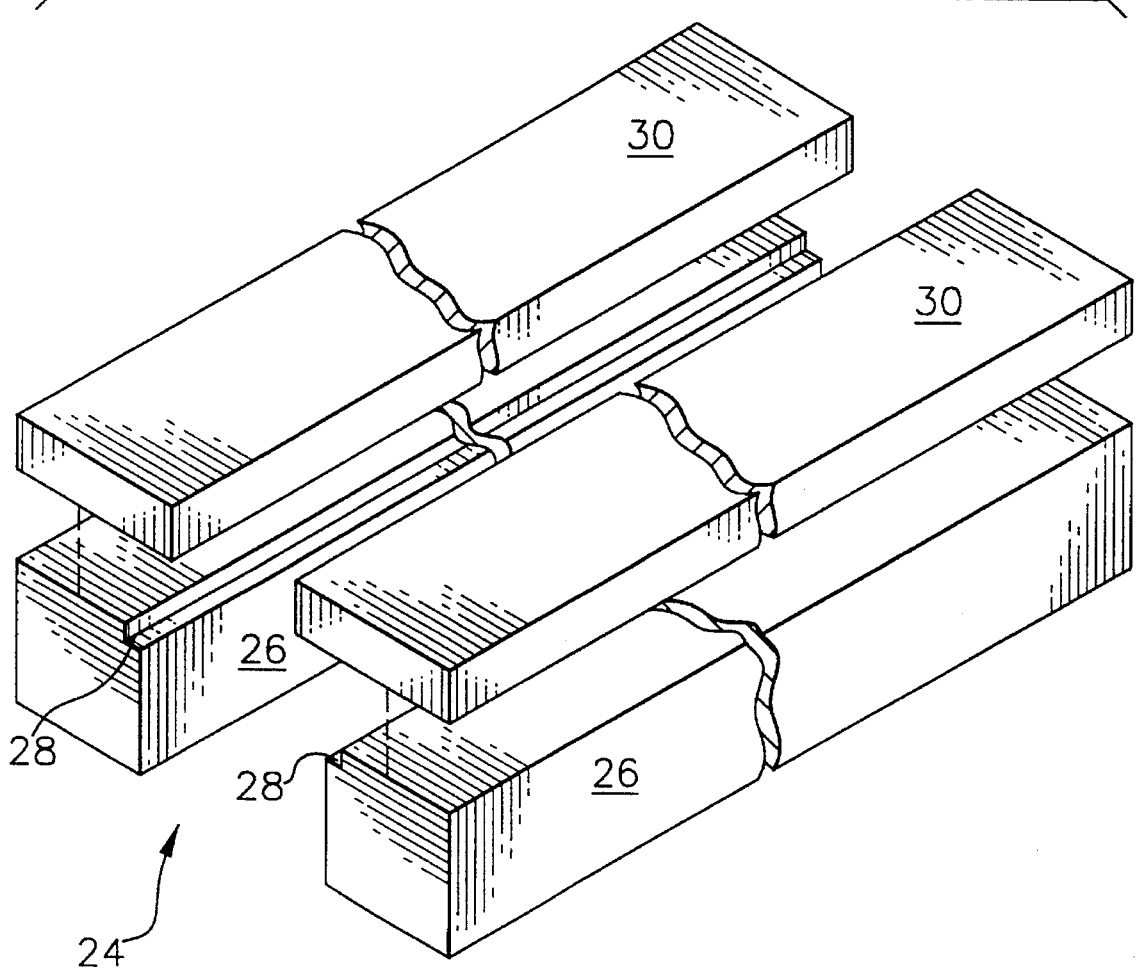
FIG. 1 is a perspective, broken top view of a fixture and retaining strips for use in the method according to the present invention.
Figure 5:
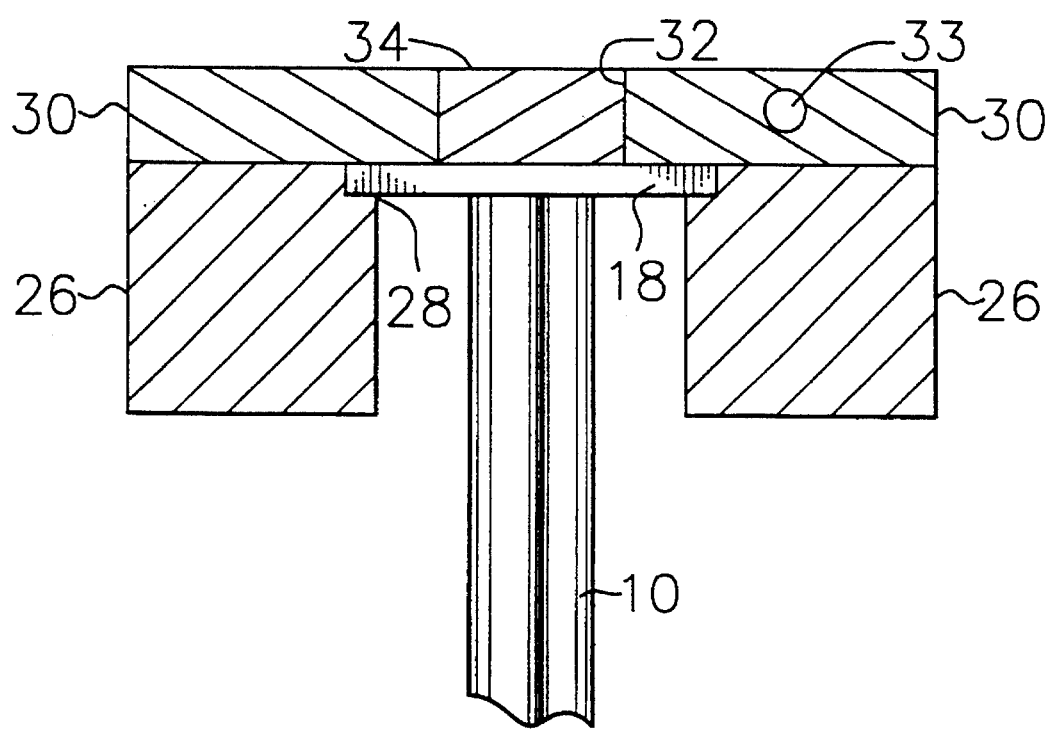
FIG. 5 is a side section view of the holding fixture, retaining strips, turbine blades, backing plate and deposited weldment.
Figure 6:
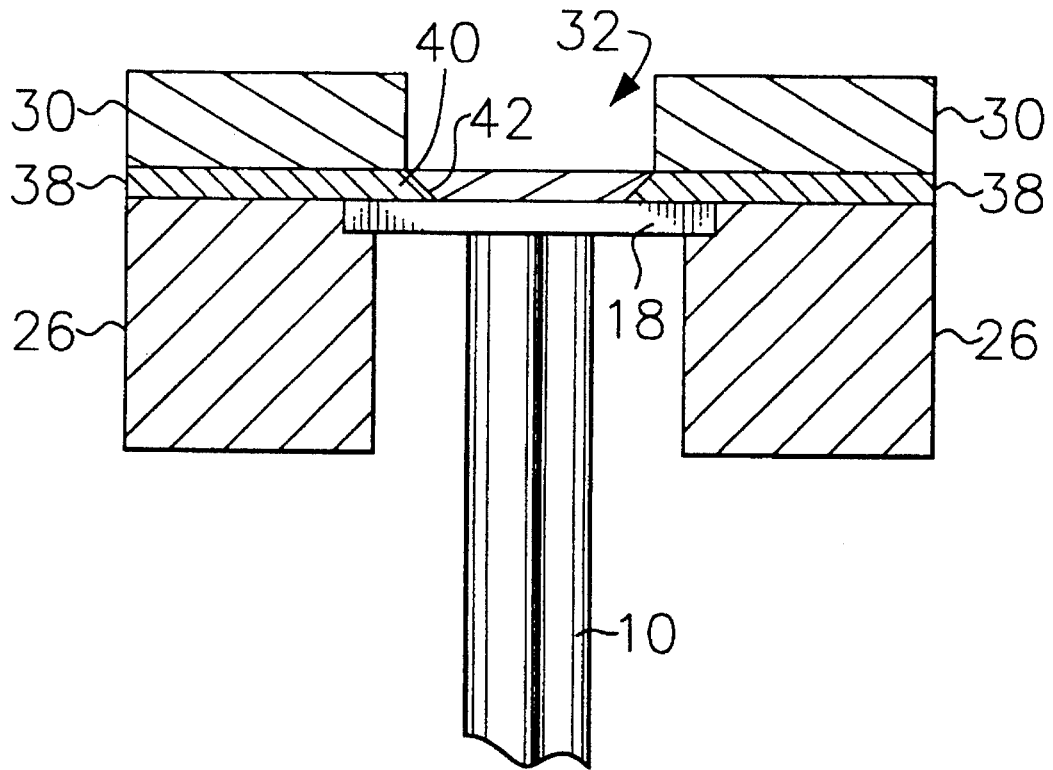
FIG. 6 illustrates the fixture, backing plate, retaining strips and turbine blades for weldment deposit for fashioning an integral turbine blade end.

As shown in FIGS. 1, 5 and 6, the backing plate 18 with attached blades 10 is coupled to a fixture 24. The fixture 24 includes at least one, but preferably a pair of spaced support members 26 each having a longitudinally extending notch 28 adapted to nest an edge of the backing plate 18. As can be appreciated, the backing plate 18 is positioned to be supported by the support members 26 such that the blades 10 depend therefrom between the support members 26 as shown in FIGS. 5 and 6. The support members 26 thereby hold and support the backing plate 18 and blades 10 in position for repair of the ends 12, 14.

To cooperate with the support members 26 at least one and preferably a pair of retaining strips 30 are provided. As shown in FIGS. 1, 5 and 6 retaining strips 30 are adapted to trap the backing plate 18 as supported by support members 26. The retaining strips 30 may be clamped in position to retain the backing plate 18 as shown. Furthermore, and in cooperation with the backing plate surface 16, the retaining strips 30 define a space or channel 32 to receive weldment as described below. To assist in confinement of the weldment, the retaining strips 30 may be manufactured as by copper or any other suitable alloy which resists adherence thereto of the weldment. Furthermore, the retaining strips 30 may be cooled as by a cooling conduit 33 fashioned which provides for circulation of a cooling media through each of the retaining strips 30.

Subsequent to the positioning of the blades 10 at the backing plate 18 and the securing of the backing plate 18 within the fixture 24, weldment 34 is built up in the channel 32 preferably by use of an automated welding machine. The weldment 34 may be layered through one or more passes to produce a build-up of weldment 34 as best shown in FIGS. 4 and 5 and may be accomplished through the use of an automated welding device. The weldment may be deposited through *gas tungsten arc welding processes, plasma-arc welding, electron beam welding, laser-beam welding, submerged arc welding or gas metal arc welding.

After a sufficient weldment 34 has been built up atop the backing plate surface 20 and has cooled, the backing plate 18 is removed from the fixture. Circulation of a cooling media through the retaining strips 30 cooperates to reduce the cooling time for the weldment. As shown in FIG. 4 the weldment 34 build-up atop the backing plate 18 has also built-up on the blade ends 12, 14 which were presented at the surface 20. Subsequent to removal from the fixture 24, the arrangement as shown in FIG. 4 may be separated for individual machining of the blade ends into the desired configuration or, alternatively, some or all of the machining of the blade distal ends 14 may be effectuated with the blades retained together on the backing strip 18.

As can be appreciated, the buildup of the weldment 34 has built up the blade ends to an extent to permit machining thereof into the desired configuration. As can further be appreciated, the method as described above provides for the buildup of weldment 34 on a plurality of blades 10 together providing for relatively large numbers of blades 10 to be repaired quickly and efficiently. This not only saves the cost of replacing damaged blades with new blades since the blades are repaired but also decreases turbine down time in that the damaged turbine blades can be repaired and the distal ends 14 fashioned quickly and easily and the blades and turbine returned to service.

With reference to FIG. 6, a fixture 36 is provided for the building up of weldment to define an integral shroud. As shown in FIG. 6, the fixture 36 includes planer templates 38 disposed between support members 26 and retaining strips, the templates 38 each having a longitudinal chamfer 40 presented at the channel 32. Accordingly, when weldment 34 is built up in the channel, the template chamfers 40 provide for an undercut 42 of the weldment. As above, the templates 38 may be fashioned from a material which resists adhesion of the weldment thereto, or a material similar to blades 10. In this fashion the undercut or any other suitable shape or design can be imposed upon the weldment buildup to decrease the extent of machining necessary to fashion the desired distal end 14 for the blades 10 where the templates 38 are the same material as the blades 10, deposit of weldment 34 not only builds up in the channel 32 but also acts to bond the templates to the blade second end 14. Thereafter the weldment 34 and templates 38 bonded thereby can be machined to define an integral shroud or other desired shape.

Further, either end of the blade can be repaired by the method according to the present invention. Once weldment has been built-up, machining can create either the tennon and surrounding structure or the shape adapted to couple the blade to the rotor.

While I have shown and described certain embodiments of my invention, it is understood that it is subject to many modifications, changes in alterations which do not depart from the spirit and scope of the invention which is only to be limited by the appended claims.

I claim:

1. A method for fashioning an end of a turbine blade comprising:

securing at least one blade to a backing plate to present the blade end through one side of the plate;

positioning the backing plate and blade in a holding fixture, said fixture including at least one restraining strip abutting the plate one side to define in cooperation with the plate a space adjoining the presented turbine blades ends;

depositing a plurality of layered weldments in the space and on the backing plate and presented turbine blade end to build-up weldment on the blade end;

removing the backing plate and deposited weldment from the fixture; and machining the weldment and freeing the blade from the backing plate to fashion the turbine blade end.

2. The method of claim 1 further including cooling the restraining strip.

3. The method of claim 2 wherein cooling of the strip includes circulating a cooling media through the strip.

4. The method of claim 1 wherein the fixture includes a pair of substantially parallel spaced restraining strips located to abut the plate to define the space as a channel, said strips and backing plate co-acting to confine the depositing of the layered weldment in the channel and on the backing plate.

5. The method of claim 4 further including circulating a cooling media through said restraining strips.

6. A method for reconstructing the ends of turbine blades comprising:

securing the blades to a backing plate to present the ends to be repaired at one side of the plate;

positioning the plate and blades in a holding fixture, the fixture having at least one restraining strip to cooperate with the one side of the plate to define a space;

depositing a plurality of layered weldments in the space on the plate one side and turbine blade ends, the weldment confined by the restraining strip in said space;

removing the backing plate and blades from the fixture; and machining the deposited layered weldment and separating the blades from the backing plate to fashion the turbine blade ends.

7. The method of claim 6 wherein the positioning step includes positioning the plate and blades in the holding fixture, the fixture including a pair of restraining strips disposed to define in cooperation with the plate the space as a channel.

8. The method of claim 6 further including cooling each restraining strip.

* * * * *